(12) United States Patent
Greif et al.

(10) Patent No.: US 6,572,667 B1
(45) Date of Patent: Jun. 3, 2003

(54) FILTER SYSTEM

(75) Inventors: Volker Greif, Harthausen (DE); Edvard Kopec, Speyer (DE); Manfred Winter, Oedheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/708,507

(22) Filed: Nov. 9, 2000

(30) Foreign Application Priority Data

Nov. 9, 1999 (DE) .......................................... 199 54 720

(51) Int. Cl.⁷ .......................... B01D 50/00; B01D 29/58
(52) U.S. Cl. .......................... 55/323; 55/337; 55/385.3; 55/447; 55/486; 55/493; 55/498; 55/502
(58) Field of Search .......................... 55/337, 321, 323, 55/385.3, 447, 486, 497, 498, 493, 502, 510, 492

(56) References Cited

U.S. PATENT DOCUMENTS

| | | | | |
|---|---|---|---|---|
| 3,584,439 A | * | 6/1971 | Gronholz | 55/337 |
| 4,243,397 A | | 1/1981 | Tokar et al. | 55/487 |
| 4,491,460 A | | 1/1985 | Tokar | 55/337 |
| 4,813,385 A | | 3/1989 | Yamaguchi et al. | 123/2 |
| 5,082,476 A | * | 1/1992 | Kahlbaugh et al. | 55/320 |
| 5,320,653 A | * | 6/1994 | Morgan et al. | 55/337 |
| 5,685,985 A | * | 11/1997 | Brown et al. | 210/450 |

FOREIGN PATENT DOCUMENTS

| | | |
|---|---|---|
| DE | 196 18 198 | 1/1998 |
| DE | 197 56 247 | 6/1999 |

* cited by examiner

Primary Examiner—Robert A. Hopkins
(74) Attorney, Agent, or Firm—Crowell & Moring LLP

(57) ABSTRACT

A filter system for the air intake of an internal combustion engine, in which an oval filter element is disposed in a housing, and a pre-separator is also provided which includes one or more cyclones.

10 Claims, 2 Drawing Sheets

FILTER SYSTEM

BACKGROUND OF THE INVENTION

The present invention relates to a filter system for the air intake of internal combustion engines.

An air filter is described in published German Patent Application No. DE 197 56 247, which serves especially for cleaning the air taken in by an internal combustion engine. The air filter is of a substantially oval or elliptic shape. This has the purpose of improving the drainage of any water that might enter the filter and of improving the air throughput capacity of the filter.

The disadvantage of this shape is that, when this filter element becomes heavily loaded with dust, the difference in pressure between the raw air side and the clean air side increases very greatly, and this leads very soon to the clogging of the filter. Therefore an additional outside jacket is applied to this filter element, which is intended to hold out coarser particles this outer jacket, however, also requires additional space, so that the space saving effect of the oval filter is not achieved or is achieved only to a very limited extent.

A product separator is disclosed in published German Patent Application No. DE 196 18 198, which serves to separate solid particles from a gas stream. For this purpose, a filter cartridge is provided, which is arranged in a housing. The housing furthermore comprises a baffle which is intended to direct a portion of the inflowing solid particles directly into a container without loading the filter. A disadvantage of this so-called "pre-separator" is that only relatively large dirt particles are removed. A large part of the dust and floating substances reaches the filter cartridge and leads to a rapid build-up of a filter cake which increases the resistance to flow.

SUMMARY OF THE INVENTION

It is the object of the invention to provide a filter which avoids these disadvantages and to create a filter system which exhibits a high degree of separation and at the same time a long useful service life. It is precisely in the use of farm machinery, utility vehicles or other machines that a very high degree of separation is required. Nevertheless the filter system required should not be bulky.

These and other objects are achieved in accordance with the invention by providing a filter system for the air intake of an internal combustion engine, the filter system comprising a housing, a pre-separator, a main filter element disposed in the housing, and a cover closing the housing, wherein both the housing and the filter element have a substantially oval contour which is adapted to the contour of a covering for the internal combustion engine.

In accordance with another aspect of the invention, the objects are achieved by providing a filter system for an air intake of an internal combustion engine, the filter system comprising an oval housing, a cover disposed at one end of the oval housing for closing the housing, the housing having a clean air outlet connection disposed opposite from the cover and an unfiltered air inlet provided on the geodetically lower side of the housing, at least one cyclone separator arranged to receive air from the unfiltered air inlet, the cyclone separator comprising a guide element, a dust collecting chamber, and a clean air opening, an oval, pleated filter element disposed in the housing, a radial sealing gasket sealingly interposed exteriorly of the pleated filter element between the pleated filter element and the clean air outlet such that a clean air space inside the clean air outlet is sealingly separated from a raw air space outside the pleated filter element, the pleated filter element having an end plate disposed opposite from the clean air outlet, and a compression spring disposed between the end plate of the pleated filter element and the cover of the housing such that the compression spring urges the pleated filter element against the clean air outlet and retains the pleated filter element in the housing.

In accordance with a still further aspect of the invention, the objects are achieved by providing a filter element for installation in a housing of an air filter system of an internal combustion engine; the filter element comprising an oval supporting body, a pleated paper main filter supported by the supporting body; a filter fleece also supported by the supporting body, a first end plate sealingly connected to the main filter, the first end plate having a gasket receptacle thereon, the gasket receptacle comprising two radially outwardly extending branches, a profiled gasket member disposed between the radially outwardly extending branches such that when the filter is installed in a housing, the gasket member produces a radial seal between the filter element and the housing, and a second end plate sealingly connected to the main filter opposite from the first end plate, the second end plate being closed and having a contour which receives a compression spring.

An important advantage of the invention is that the combination of an oval filter element requiring little space and having a centrifugal separator makes possible an especially compact form.

In accordance with one embodiment of the invention, a secondary element is provided within the filter system and within the main filter element. When the main filter element is replaced the secondary filter element remains on the clean air connection, so that the entry of dust or dirt into the clean air area is prevented during replacement of the main filter element.

In another embodiment of the secondary element, a fleece material is used. This fleece material has the advantage of assuring good protection of the clean air area combined with a low resistance to flow.

In another advantageous embodiment, which relates to the mounting of the main filter element, the main filter element is provided with an externally placed radial seal on the end facing the clean air connection. A compression spring thrusting on the one hand against the main filter element and on the other hand against a housing cover provides reliable support for the main filter element in the housing.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
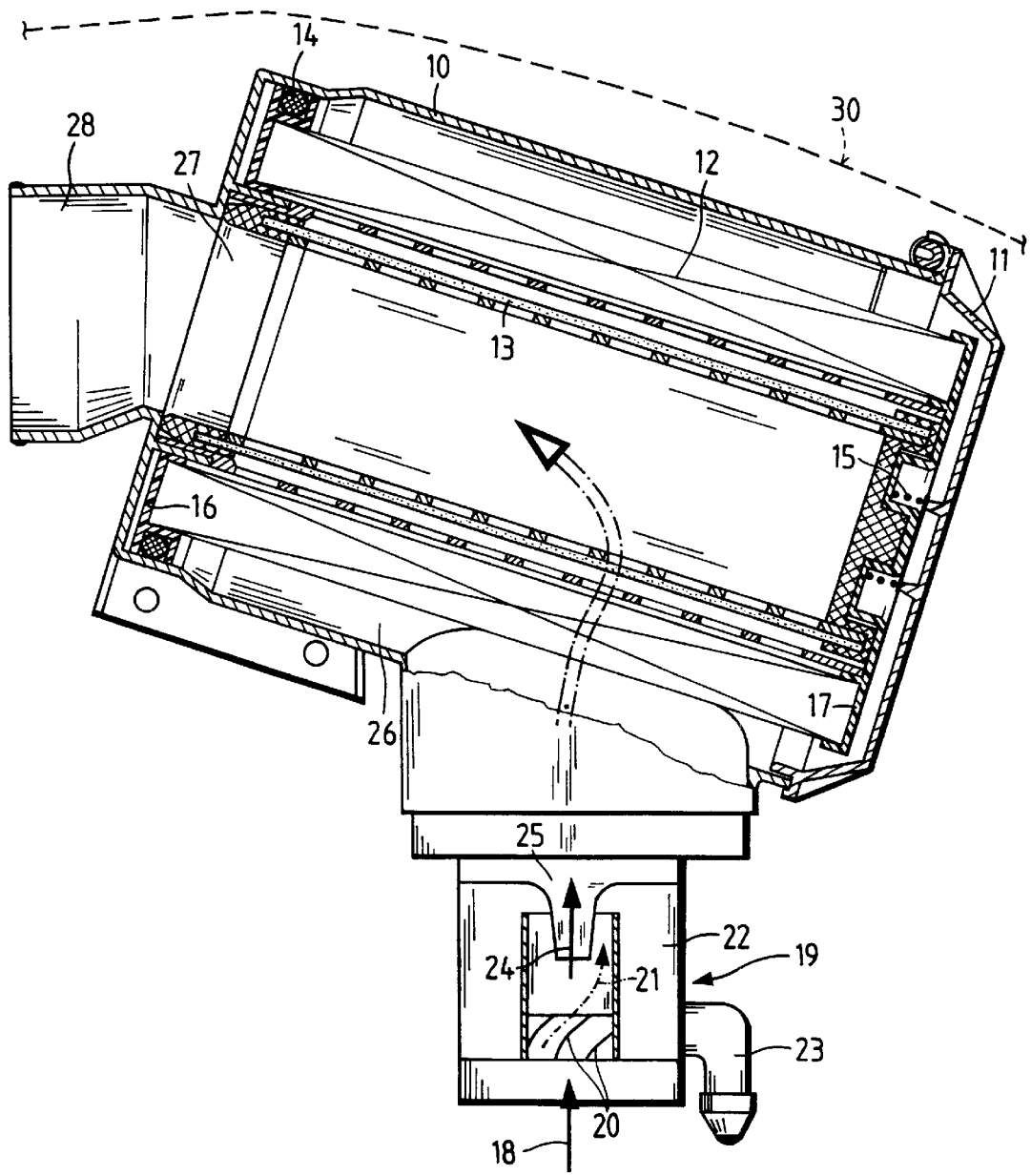
FIG. 1 is a sectional view through a filter according to the present invention.

The filter system according to FIG. 1 comprises a housing 10 which can be closed by a hinged cover 11. In the housing 10 there is a filter element 12 as the main filter element, as well as a filter element 13 as secondary element or safety filter. The filter element 12 is provided at its left end with a gasket 14 and is there in contact with the housing. At the right end the filter element is urged against the cover 11 by a spring 15 on the cover 11. The compression spring secures the filter element in the position shown in FIG. 1. The filter element 12 is comprised of a pleated filter paper or filter fleece which is held by two end plates 16 and 17. The contaminated intake air to be filtered first flows according to arrow 18 into a pre-separation system 19. This pre-separation system 19 is comprised of individual cyclone separators, only one element being shown as a representative of the plurality of cyclone separators. This element 20 sets the entering raw air in rotation, so that dust particles are flung outwardly according to the arrow 21, to where they enter a dust accumulating chamber 22 and can be discharged through the dust discharge valve 23. The precleaned air flows centrally according to arrow 24, upwardly through a clean air opening and on into the outer area 26 of the secondary filter system. As this air flows through the filter element 12 the residual particles are filtered out. The cleaned intake air enters into the clean air area 27 and flows from there through the clean air opening 28 to the internal combustion engine, which is not shown.

Figure 2:
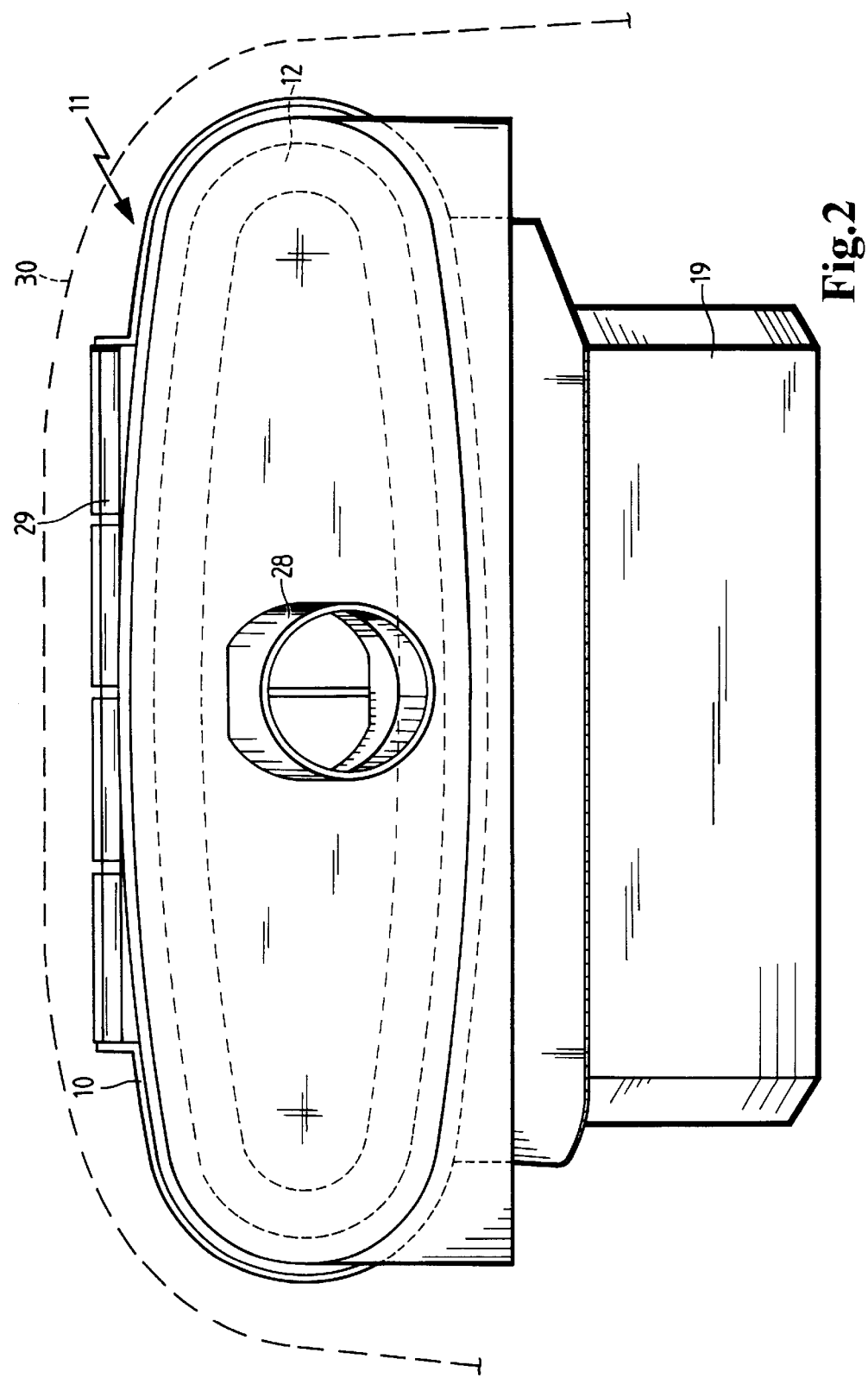
FIG. 2 is a view of a filter according to the invention seen from the clean air side.

FIG. 2 shows a plan view of the configuration of the housing 10 and thus also of the filter element 12. The housing 10 is of substantially oval shape. The cover 11 is attached to the housing 10 by the hinge 29. The filter element 12 conforms to the oval shape of the housing 10 and therefore provides a very large active filter area. The centrifugal separator area 19 extends over nearly the entire breadth of the oval housing 10 and thus allows a high air throughput. The broken line 30 in FIG. 2 and also in FIG. 1 represents the contour of the motor hood of the vehicle. It is evident that the filter system is optimally fitted to this contour.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A filter system for the air intake of an internal combustion engine, said filter system comprising a housing, a pre-separator, a main filter element disposed in the housing, a pivotable cover attached to the housing by a hinge for closing the housing, and a safety filter element disposed inside said main filter element for preventing dust from entering a clean air space during a replacement of the main filter element, wherein the safety filter element is a fleece filter element, and wherein both the housing and the filter element have a substantially oval contour which is adapted to the contour of a covering for the internal combustion engine.

2. A filter system according to claim 1, wherein said at least one pre-separator is a cyclone separator.

3. A filter system according to claim 1, wherein said main filter element is a pleated paper filter element.

4. A filter system according to claim 1, wherein during the replacement of the main filter element, the safety filter element remains at an entry to the clean air space.

5. A filter system according to claim 1, further comprising a radial gasket provided externally on the main filter element at a first end of the main filter element which faces a clean air outlet, and a compression spring disposed at a second end of the main filter element opposite the first end, said compression spring being positioned between the second end of the main filter and the cover which closes the filter housing and urging the main filter against the clean air outlet.

6. A filter element for installation in a housing of an air filter system of an internal combustion engine; said filter element comprising an oval supporting body, a pleated paper main filter supported by said supporting body; a filter fleece also supported by said supporting body, the filter fleece being disposed inside said main filter for preventing dust from entering a clean air space during a replacement of the main filter; a first end plate sealingly connected to the main filter, said first end plate having a gasket receptacle thereon, said gasket receptacle comprising two radially outwardly extending branches, a profiled gasket member disposed between said radially outwardly extending branches such that when the filter element is installed in a housing, the gasket member produces a radial seal between the filter element and the housing, and a second end plate sealingly connected to the main filter opposite from said first end plate, said second end plate being closed and having a contour which receives a compression spring.

7. A filter element according to claim 6, wherein said contour comprises a substantially cylindrical projection on which the compression spring is received.

8. A filter element according to claim 6, wherein said contour comprises a substantially annular recess in which the compression spring is received.

9. A filter element according to claim 6, wherein said contour comprises a substantially cylindrical recess in which the compression spring is received.

10. A filter element according to claim 6, wherein said filter paper forms a ring and said filter fleece is disposed inside the filter paper ring.

* * * * *